Figure 8:
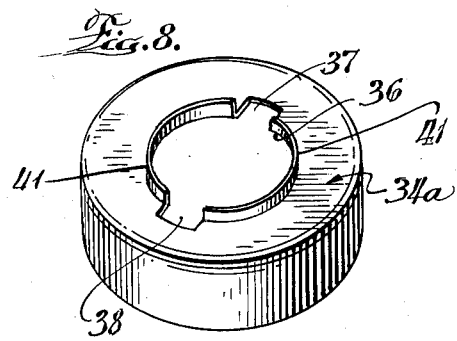

April 30, 1963 D. A. LOPER 3,087,638
CLOSURE ASSEMBLY
Filed Dec. 15, 1961 2 Sheets-Sheet 1
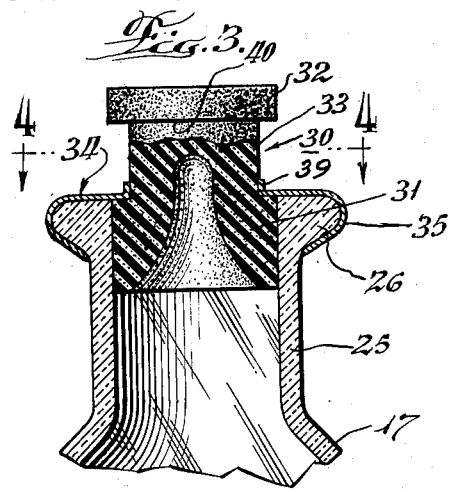
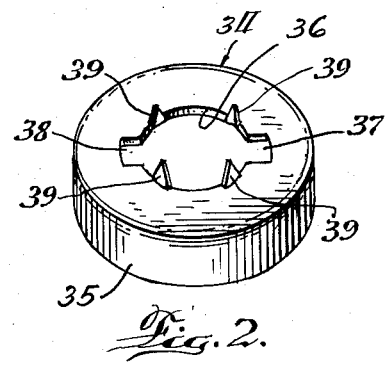
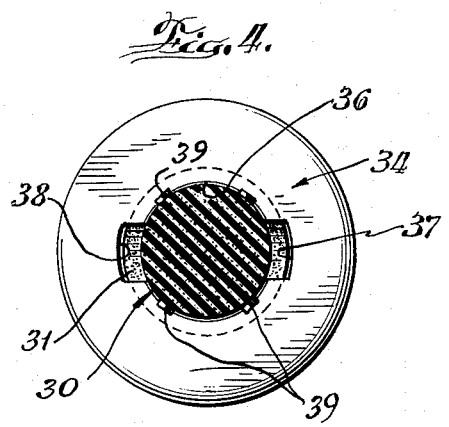
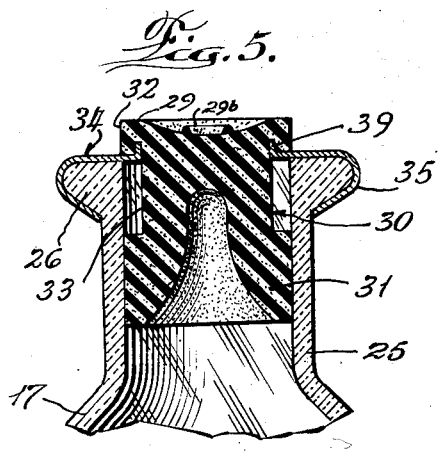
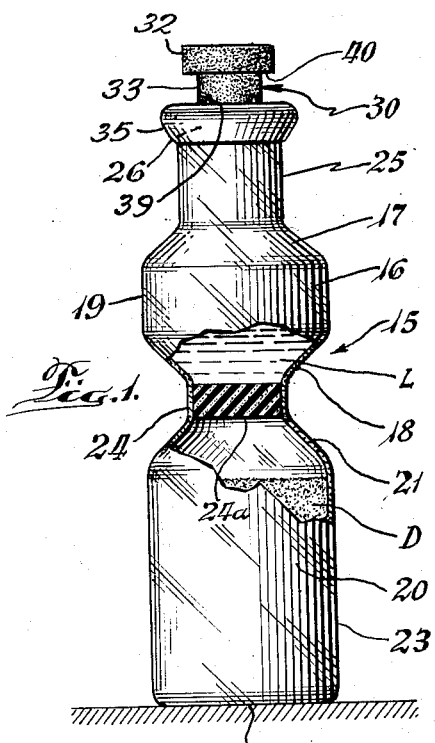
Inventor:
Douglas A. Loper
By Joseph J. Grass
Attorney April 30, 1963   D. A. LOPER   3,087,638
CLOSURE ASSEMBLY
Filed Dec. 15, 1961   2 Sheets-Sheet 2

Inventor:
Douglas A. Loper
By Joseph J. Grass
Attorney

United States Patent Office 3,087,638
Patented Apr. 30, 1963

3,087,638
CLOSURE ASSEMBLY
Douglas A. Loper, Winnetka, Ill., assignor to Abbott Laboratories, North Chicago, Ill., a corporation of Illinois
Filed Dec. 15, 1961, Ser. No. 159,547
7 Claims. (Cl. 215—6)

This invention relates to a closure assembly for a plural compartment container suitable for storing both liquid and solid ingredients separately. The type of plural compartment container with which the closure assembly of the invention is particularly useful is the type wherein a liquid ingredient is contained in one compartment and a dry ingredient separated from the liquid ingredient is contained in another compartment. The plural compartment container is provided with a piston plug which is slidable in a tubular neck of the container. When the piston plug is moved inwardly of the container, the piston plug is operative to force a center sealing member into the lower compartment so that the liquid ingredient and the dry ingredient come into contact with each other. The piston plug is normally manually actuated so that the center sealing member is dislodged. A piercing needle connected to a container or the like is then inserted through the piston plug and the solution in the plural compartment container is drawn therefrom.

It is one of the purposes of the invention to provide a closure assembly of which the piston plug is prevented or restrained from passing into the container when manual pressure is exerted on an enlarged head of the piston plug. In the event that the piston plug were to pass into the container, there is a likelihood that the solution would be contaminated or spilled, and moreover, it would be difficult if not impossible to withdraw the solution from the container through a piercing needle without contamination. It is a feature of the invention therefore to provide an effective and economical closure assembly for a plural compartment container which prevents or restrains the enlarged head portion of the piston plug from passing into the tubular neck of the container.

In the preferred embodiment of the invention, there is provided a ring which is anchored to a beaded neck of the container and which receives the piston plug. The ring is provided with one or more sharp projections which project and penetrate into the underside of the enlarged head portion to prevent or restrain the enlarged head portion from deforming and passing through a central hole of the ring and passing into the container.

In another embodiment of the invention there is provided a ring having one or more outwardly projecting ridges which project into a recess in the underside of the enlarged head when the piston plug is moved inwardly.

In another embodiment of the invention there is provided a ring having a central opening which receives the piston plug and having one or more sharp projections. The ring of this embodiment of the invention is not anchored to the container as in the other embodiments of the invention.

Figure 9:
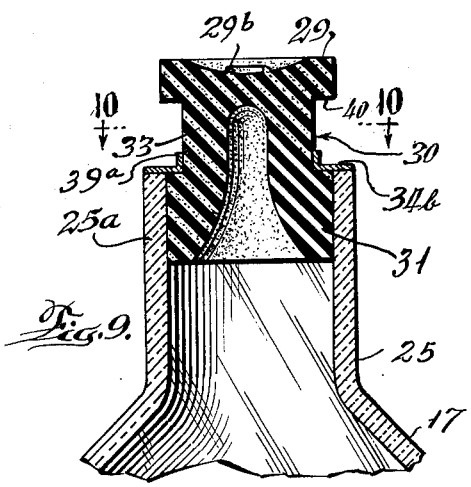
Figure 6:
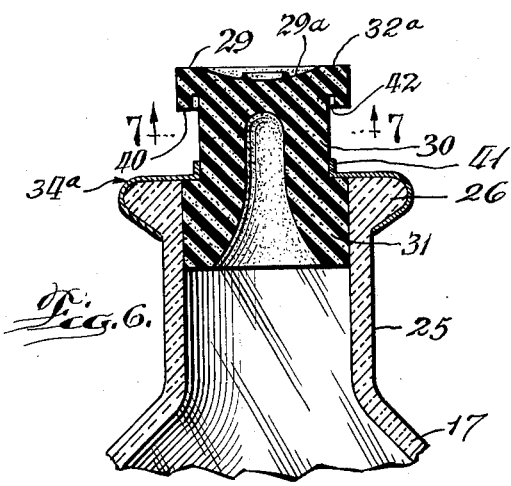
Figure 11:
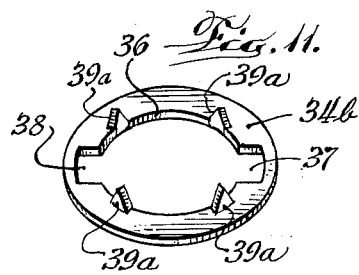
Figure 7:
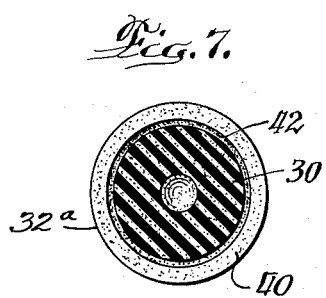
Figure 10:
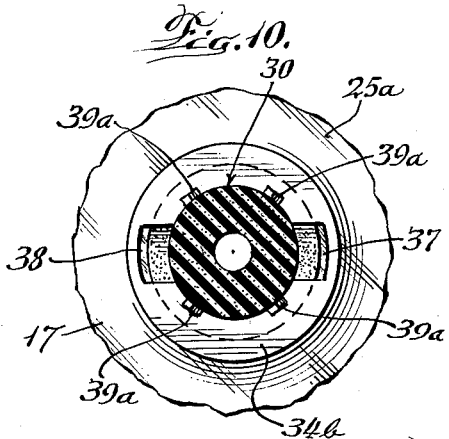

In the diagrammatic drawings:
FIGURE 1 is a side elevation view partly in cross-section of a plural compartment container employing the preferred embodiment of the closure assembly of the invention;
FIGURE 2 is a perspective view of the ring of the preferred embodiment of the invention shown before it is anchored to the container;
FIGURE 3 is a side elevation view mainly in cross-section of the closure assembly of the invention shown in its outward position and a fragmentary portion of a plural compartment container;

FIGURE 4 is a cross-sectional view taken along line 4—4 of FIGURE 3;
FIGURE 5 is a cross-sectional view of the closure assembly of the invention shown in its inward position and a fragmentary portion of a plural compartment container;
FIGURE 6 is a side elevation view mainly in cross-section of another embodiment of the closure assembly of the invention shown in its outward position and fragmentary portion of a plural compartment container;
FIGURE 7 is a cross-sectional view taken along line 7—7 of FIGURE 6;
FIGURE 8 is a perspective view of a modified form of ring before it is anchored to the container and employable with the embodiment of the invention shown in FIGURES 6 and 7;
FIGURE 9 is a cross-sectional side elevation view of another embodiment of the closure assembly of the invention and a fragmentary portion of a plural compartment container;
FIGURE 10 is a cross-sectional view taken along line 10—10 of FIGURE 9; and
FIGURE 11 is a perspective view of a modified form of ring employable with the embodiment of the invention shown in FIGURES 9 and 10.

Throughout the specification like reference characters are employed to designate components having the same construction, function and relative location.

Referring now to FIGURE 1 of the illustrative drawings, there is shown a plural compartment container generally indicated at 15 having an upper compartment 16 defined by an inwardly inclined portion 17 and an outwardly inclined portion 18 joined by a tubular portion 19; a lower compartment 20 is defined by an inwardly inclined portion 21 and a bottom wall 22 joined by a tubular portion 23. The outwardly inclined portion 18 and the inwardly inclined portion 21 are joined by a neck 24. The inwardly inclined portion 17 is formed integrally with a tubular neck 25. The tubular neck 25 is shown to be beaded as indicated at 26. A center sealing member 24a is normally fitted snugly internally of the neck 24 so that a liquid ingredient L in the upper compartment 16 is separated from a dry ingredient D in the lower compartment 20. The dry ingredient D could be contained in the upper compartment 16 and the liquid ingredient L could be contained in the lower compartment 20, if desired.

A piston plug 30 having a piston portion 31 and an enlarged head portion 32 joined by a thrust post portion 33 is provided to seal off the compartment 16 from the outside of the container 15. The piston portion 31 is snugly fitted in the tubular neck 25 so that when a force in the form of manual pressure is applied to the topside 29 of the enlarged head portion 32, the piston plug 30 is effective to act upon the liquid to dislodge the center sealing member 24a out of its seating position internally of the neck 24 so that the liquid ingredient L and the dry ingredient D combine. A ring 34 is provided in the preferred embodiment which has a depending flange 35 for purposes of anchoring the ring 34 on the bead 26 of the tubular neck 25. The ring 34 is provided with a central hole 36 which is preferably slightly larger than the thrust post portion 33, which it receives, to provide clearance.

The ring 34 is also shown to be provided with opposed cutout portions 37 and 38 which in effect provide localized enlargements, respectively, of the central hole 36. The cutout portions 37 and 38 assist in the assembly operation in that they permit the enlarged head 32 to be squeezed through the central hole 36 of the ring 34. The topside 29 is inwardly dished as indicated at 29a and provided with a needle locating ring 29b.

In accordance with the invention, the ring 34 is shown to be provided with a plurality of integrally formed spaced sharp projections 39 which extend outwardly of the container 15. The central hole 36, the cutout portions 37 and 38, and the projections 39 are cut in one operation. The projections 39 are then bent to the position shown in FIGURES 1 through 5. FIGURE 3 is illustrative of the outward position of the piston plug 30 before use, while FIGURE 5 is illustrative of the inward position of the piston plug 30 after it has been forced inwardly manually. In the position shown in FIGURE 5, the sharp projections 39 have penetrated into the underside 40 of the enlarged head portion 32 to prevent or restrain the enlarged head portion 32 from passing through the central hole 36 of the ring 34 when manual finger or needle pressure is applied to the topside 29 of the enlarged head portion 32.

Referring now to the embodiment shown in FIGURES 6 through 8 of the illustrative drawings, there is shown a modified form of ring generally indicated at 34a. The ring 34a differs from the ring 34 in that instead of providing sharp projections 39 there are shown to be provided a pair of outwardly projecting ridges 41 which are shown to extend arcuately around the periphery of the central hole 36 and which terminate at the cutout portions 37 and 38. The central hole 36, the cutout portions 37 and 38, and the ridges 41 are cut in one operation. The ridges are then bent to the position shown in FIGURES 6 and 8. The outwardly projecting ridges 41 project into what is shown to be an annular recess 42 formed in the underside 40 of an enlarged head portion 32a of the piston plug 30 when the enlarged head portion 32a is moved inwardly. The outwardly projecting ridges 41 are projectable into the recess 42 to prevent or restrain the enlarged head portion 32a from passing through the central hole 36 into the tubular neck 25.

Referring now to the embodiment of FIGURES 9 through 11, there is shown a ring 34b which receives the thrust post 33 of the piston plug 30 and which has sharp projections 39a. In this embodiment of the invention no bead or its equivalent is provided on tubular neck 25a.

In the embodiments of FIGURES 1 through 5 and FIGURES 9 through 11 the piston plug 30 is preferably composed of a resilient material which a piercing needle and the projections 39 and 39a such as, for example, natural or synthetic rubber will penetrate while in the embodiment of FIGURES 6 through 8 of the piston plug is preferably composed of a resilient material which only a piercing needle is required to penetrate.

The above-described embodiments being exemplary only it will be understood that modifications in form or detail can be made without departing from the spirit and scope of the invention. Accordingly, the invention is not to be limited save as is consonant with the scope of the following claims.

What is claimed is:

1. A closure assembly for a container having a tubular neck, comprising: a piston plug having a piston portion slidably fitted in said tubular neck and an enlarged head portion, a ring having a central hole which receives said piston plug, and means on said ring projectable into the underside of said enlarged head portion for restraining said enlarged head portion from passing through said central hole into said tubular neck.

2. The invention defined in claim 1 wherein said means includes at least one sharp projection extending outwardly from said ring.

3. The invention defined in claim 1 wherein said means includes at least one outwardly projecting ridge.

4. A closure assembly for a container having a tubular neck, comprising: a piston plug having a piston portion slidably fitted in said tubular neck and an enlarged head portion, a ring having a central hole which receives said piston plug, and a plurality of projections extending outwardly from said ring and projectable into the underside of said enlarged head portion.

5. A closure assembly for a container having a tubular beaded neck, comprising: a piston plug having a piston portion slidably fitted in said tubular beaded neck, an elongated thrust post portion axially extending from said piston portion, and an enlarged head portion on said thrust post portion, a ring anchored to said tubular beaded neck and having a central hole for receiving said thrust post portion, and means on said ring adjacent said central hole projectable into the underside of said enlarged head portion for restraining said enlarged head portion from passing through said central hole into said tubular neck when a force is applied to the topside of said enlarged head.

6. A closure assembly for a container having a tubular beaded neck, comprising: a piston plug having a piston portion slidably fitted in said tubular neck and an enlarged head portion, a ring anchored to said tubular beaded neck and having a central hole which receives said piston plug, and at least one sharp projection projecting from said ring and penetrable into said enlarged head portion for restraining said enlarged head portion from passing through said central hole into said tubular neck.

7. A closure assembly for a container having a tubular neck, comprising: a piston having a piston portion slidably fitted in said tubular neck and an enlarged head portion, a recess in the underside of said enlarged head, a ring having a central hole which receives said piston plug, and at least one outwardly projecting ridge on said ring projectable into said recess for restraining said enlarged head portion from passing through said central hole into said tubular neck.

References Cited in the file of this patent

UNITED STATES PATENTS 2,869,745     Lockhart    --------------- June 20, 1959